United States Patent [19]

Honda

[11] Patent Number: 5,515,290
[45] Date of Patent: May 7, 1996

[54] THREE-DIMENSIONAL MACHINING METHOD

[75] Inventor: Kenichi Honda, Osaka, Japan

[73] Assignee: Kabushiki Kaisha F A Labo, Osaka, Japan

[21] Appl. No.: 323,025

[22] Filed: Oct. 14, 1994

[51] Int. Cl.$^6$ .................................................. G05B 19/4099
[52] U.S. Cl. .................. 364/474.29; 364/191; 318/568.1
[58] Field of Search ................... 364/474.29, 474.24,
364/474.25, 474.26, 474.23, 191–193; 318/568.1,
569, 570; 395/119, 120, 142

[56] References Cited

U.S. PATENT DOCUMENTS

| | | | |
|---|---|---|---|
| 4,745,558 | 5/1988 | Kishi et al. | 364/474.29 |
| 4,855,921 | 8/1989 | Seki et al. | 364/474.29 |
| 4,949,270 | 8/1990 | Shima et al. | 364/474.29 |
| 4,985,840 | 1/1991 | Shinozaki | 364/474.29 |
| 5,185,855 | 2/1993 | Kato et al. | 364/474.24 |
| 5,278,767 | 1/1994 | Kishi et al. | 364/474.29 |

FOREIGN PATENT DOCUMENTS

| | | |
|---|---|---|
| 0543141 | 5/1993 | European Pat. Off. . |
| 4305409 | 8/1994 | Germany . |

OTHER PUBLICATIONS

VDI–Zeitschrift, "NC–Bandschleifen als Fein–bearbeitungsverfahren für den Werkzeug– und Formenbau", vol. 33, No. 11, Nov. 1991.

*Primary Examiner*—Joseph Ruggiero
*Attorney, Agent, or Firm*—Burns, Doane, Swecker & Mathis

[57] ABSTRACT

A plurality of curved surfaces which have distinct characteristics are defined as a unified curved surface. The definition is made by a group of polynomials with respect to parameters u and v in two directions reflecting the characteristics of the curved surfaces. Then, paths of a cutting tool to machine the unified curved surface are generated by using the polynomials. Further, a curved surface is divided by a curve into two regions, and a point is designated in one of the regions. Only with respect to the region which includes the designated point, paths of the cutting tool are generated.

2 Claims, 7 Drawing Sheets

THREE-DIMENSIONAL MACHINING METHOD

BACKGROUND OF THE INVENTION

1. Field of the Invention

The present invention relates to a three-dimensional machining method for machining a workpiece three-dimensionally with a machine tool such as a milling cutter, and more particularly to a processing control for defining a surface to be machined and generating paths of a cutting tool to machine the surface.

2. Description of Related Art

Recently, computerized three-dimensional machining of a metal workpiece has been developed for practical use. The three-dimensional machining is generally performed based on either paths of the working end of a ball tip of a cutting tool or paths of the center of the ball tip of the cutting tool.

In either method, conventionally, a plurality of surfaces to be machined are defined individually. Every surface has peculiar outline curves and should be defined so as to reflect the characteristics of the outline curves.

Figure 8A:
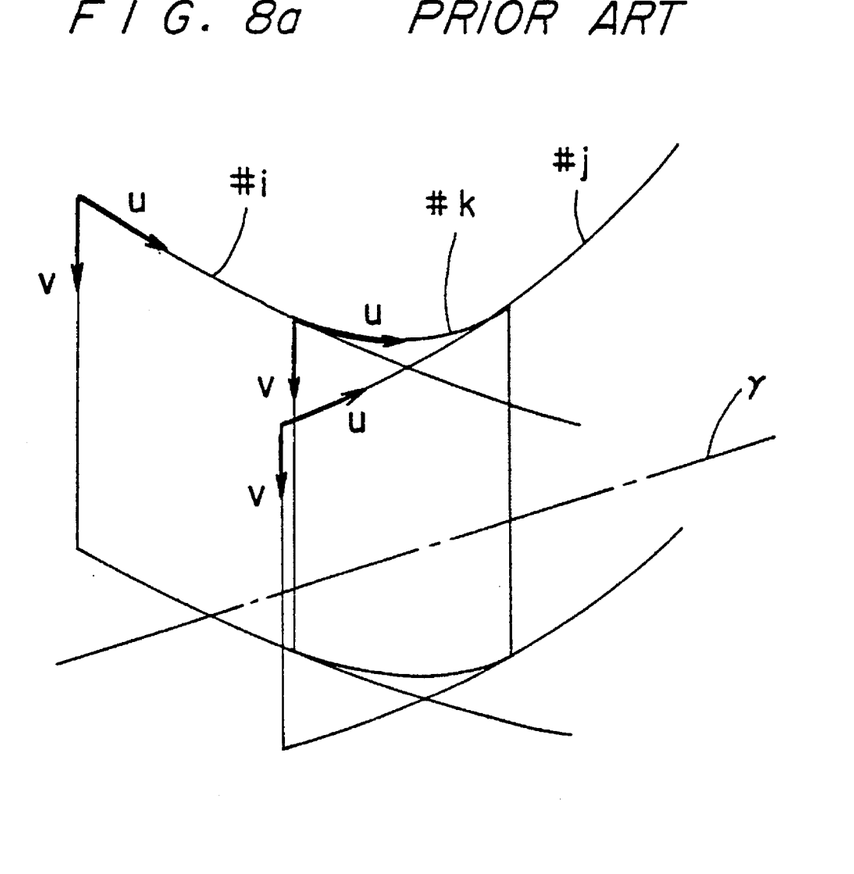
FIGS. 8a and 8b are illustrations of machining of continuous curved surfaces in a conventional three-dimensional machining method.
Figure 8B:
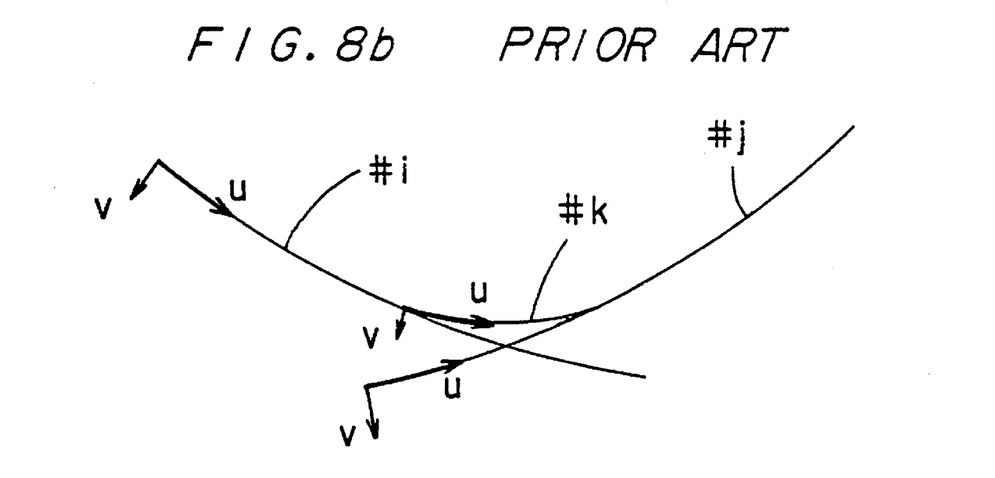

Conventionally, continuous surfaces are machined separately or by transfer cutting. For example, as shown in FIGS. 8a and 8b, three continuous surfaces #i, #j and #k are defined individually (in individual coordinate systems (u, v)). In machining the surfaces #i, #j and #k by transfer cutting, the surfaces #i, #j and #k are machined continuously by transferring a cutting tool from a path to machine the surface #i to a path to machine the surface #k and then to a path to machine the surface #j. In the transfer cutting, generation of tool paths is sometimes performed based on a direction γ which does not reflect the characteristics of all the surfaces. In this case, the transfer cutting is not in accordance with the characteristics of the surfaces, and the cutting may be rough or may be unnecessarily minute and wasteful. Further, for transfer cutting, a large volume of processing to avoid interference of the cutting tool is necessary, which takes a lot of time. In machining the continuous surfaces #i, #j and #k separately, on the other hand, movement of the cutting tool is generally wasteful.

Further, in generating tool paths, interference of the cutting tool with any surface must be checked all the time, which requires a complicate procedure.

SUMMARY OF THE INVENTION

An object of the present invention is to provide a three-dimensional machining method wherein a plurality of surfaces can be machined continuously and speedily with simple processing.

Figure 1A:
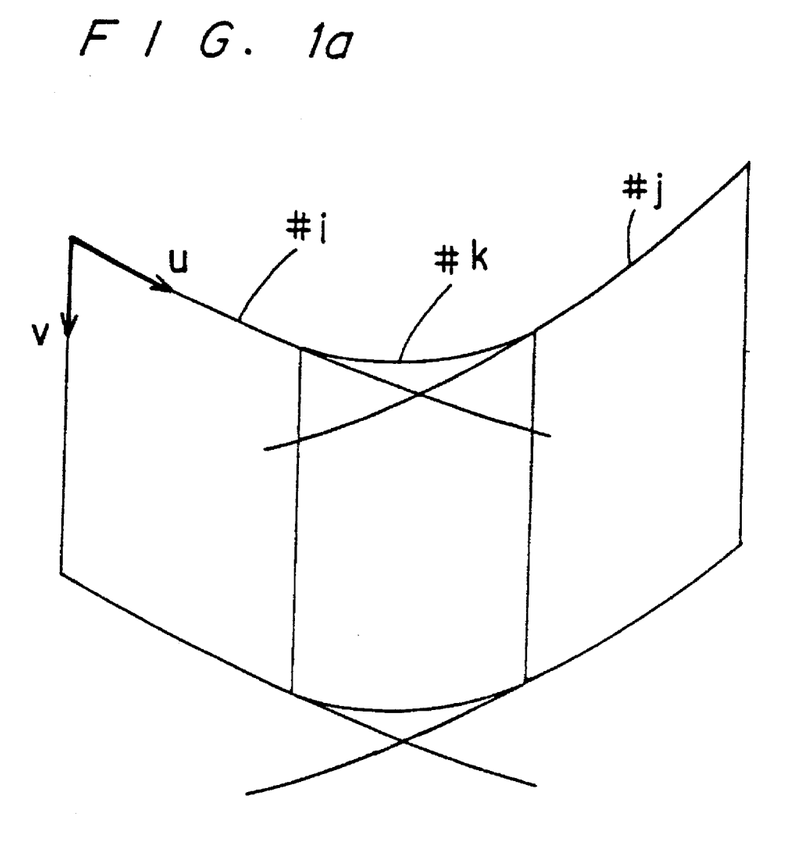
FIGS. 1a and 1b are illustrations of definition of continuous curved surfaces which have distinct characteristics as a unified curved surface.
Figure 1B:
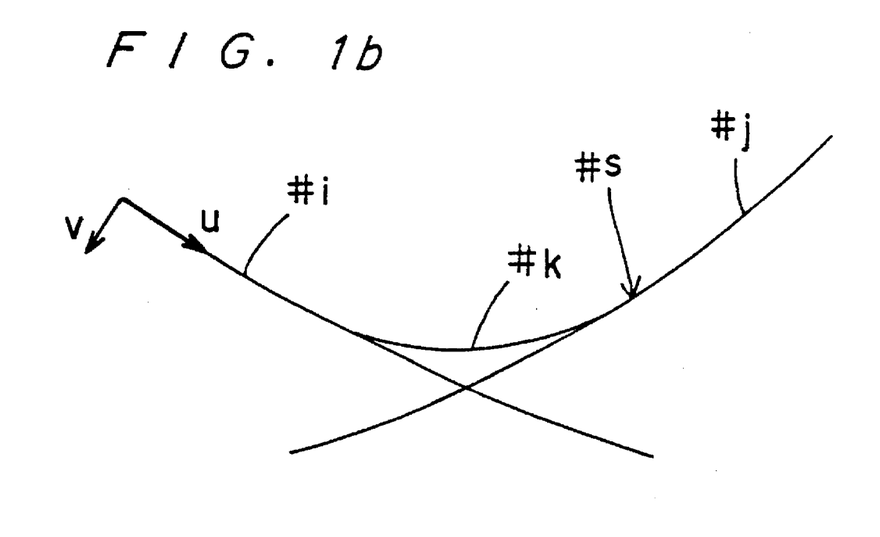

In order to attain the object, in a three-dimensional machining method according to the present invention, a plurality of surfaces which have distinct characteristics are defined as a unified curved surface. As shown in FIGS. 1a and 1b, surfaces #i, #j and #k are defined as a single surface #s. This surface #s is defined in a coordinate system (u, v) which is peculiar to the surface #s and is not an absolute system like a rectangular coordinate system. In a conventional method, the surfaces #i, #j and #k are defined in individual coordinate systems (u, v), but in the method of the present invention, by connecting the u directions of the surfaces #i, #j and #k together and the v directions of these surfaces together, the surfaces #i, #j and #k are defined in the same coordinate system (u, v). More specifically, a characteristic curve of the surface #i is connected to a characteristic curve of the surface #k and then to a characteristic curve of the surface #j. Then, cutting is performed based on the characteristics of the surface #s (the coordinate system (u, v)). In this method, check of interference of a cutting tool with a surface, which has been necessary for transfer cutting in a conventional method, is no longer necessary, and therefore, generation of tool paths becomes speedy.

Any point on a surface is defined by parameters u and v in directions peculiar to the surface. In a conventional method, points which are on continuous different surfaces are defined by use of individual parameters u and v which are peculiar to the respective surfaces. However, in the method of the present invention, points which are on continuous different surfaces are defined by use of the same parameters u and v, that is, defined based on the same standard. In the present invention, the standard is a group of polynomials as follows:

$$f(u, v) = \sum_{i,j=0}^{n} a_{ij} u^i v^j$$

By using the polynomials which are handled algebraically, definition of any point on the surfaces from values of parameters u and v, and determination of values of the parameters u and v from values in a rectangular coordinate system (x, y, z) can be speedily performed.

Further, in the method of the present invention, a surface is divided into two regions by a curve, and a point on the surface is designated. Only with respect to the region in which the designated point is located, generation of tool paths is performed. By limiting a region to be machined in this way, unnecessary processing can be omitted, which improves the efficiency of machining.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

An exemplary three-dimensional machining method according to the present invention is described with reference to the accompanying drawings.

Machining Apparatus

Figure 2:
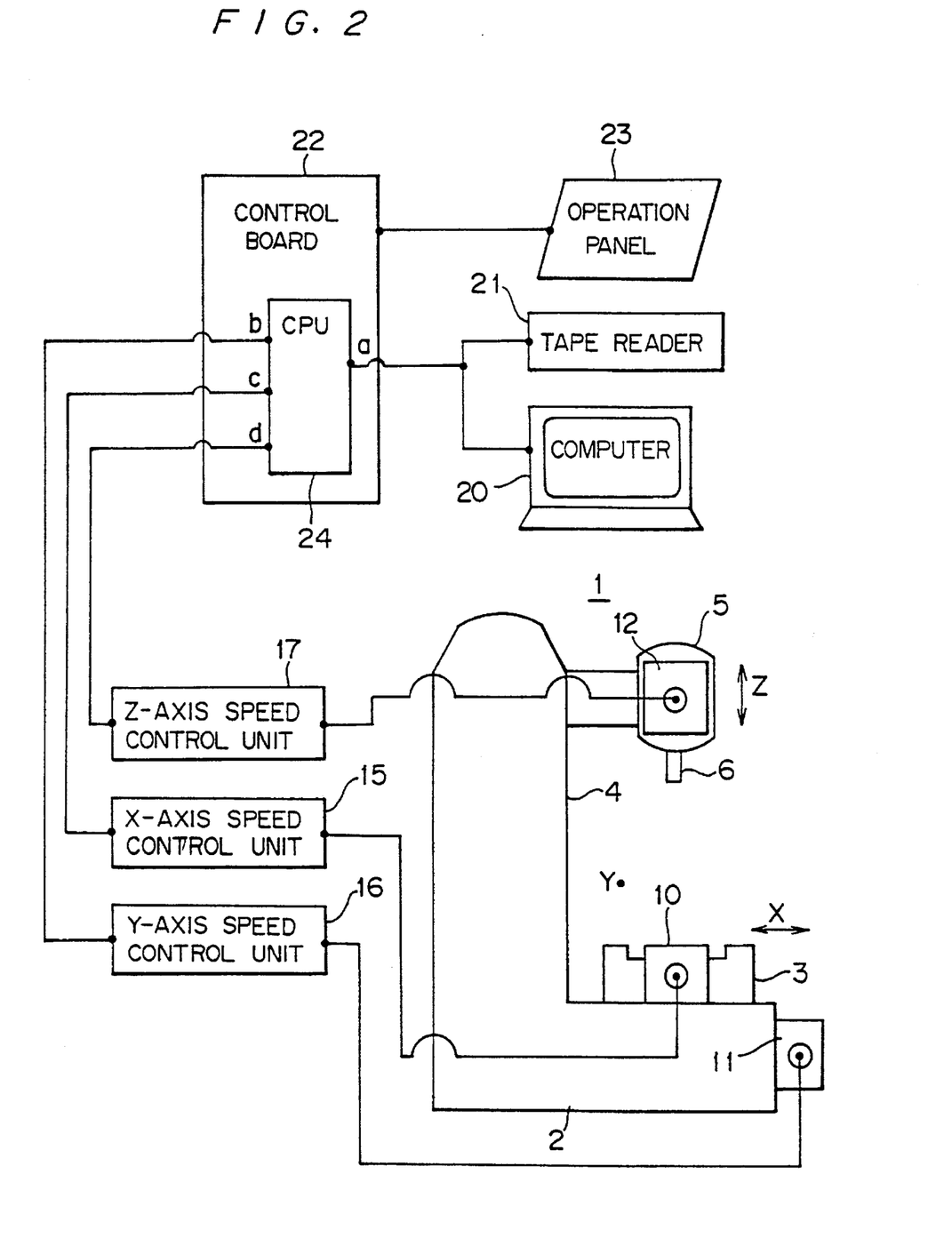
FIG. 2 is a schematic view of a machining apparatus to carry out three-dimensional machining in a method according to the present invention.

FIG. 2 shows the general structure of a machining apparatus to carry out three-dimensional machining according to the present invention. Numeral 1 denotes an apparatus body. The apparatus body 1 has a table 3 on a base 2 and a machining head 5 with a cutting tool 6 on a column 4. The table 3 is moved in the X direction and in the Y direction by an X-axis DC motor 10 and a Y-axis DC motor 11 respectively. The machining head 5 is moved in the Z direction by a Z-axis DC motor 12. The speed controls of these movements are carried out by sending control signals from control units 15, 16 and 17 to the motors 10, 11 and 12 respectively.

A graphic data processing system is composed of a 16-bit or 32-bit computer 20, a tape reader 21 and a control board 22. The tape reader 21 reads out NC data, specifically, G code as program format. The computer 20 receives graphic data in the forms of three plane views or a perspective view. The control board 22 has an operation panel 23 and incorporates a CPU 24. The CPU 24 receives graphic data and other data from the computer 20 and the tape reader 21 through an input port a. The CPU 24 generates cutting data from the input graphic data and transmits the cutting data as control signals to the control units 15, 16 and 17 through output ports b, c and d respectively.

The generation of the cutting data in the CPU 24 is hereinafter described.

Curved Surface

Figure 3:
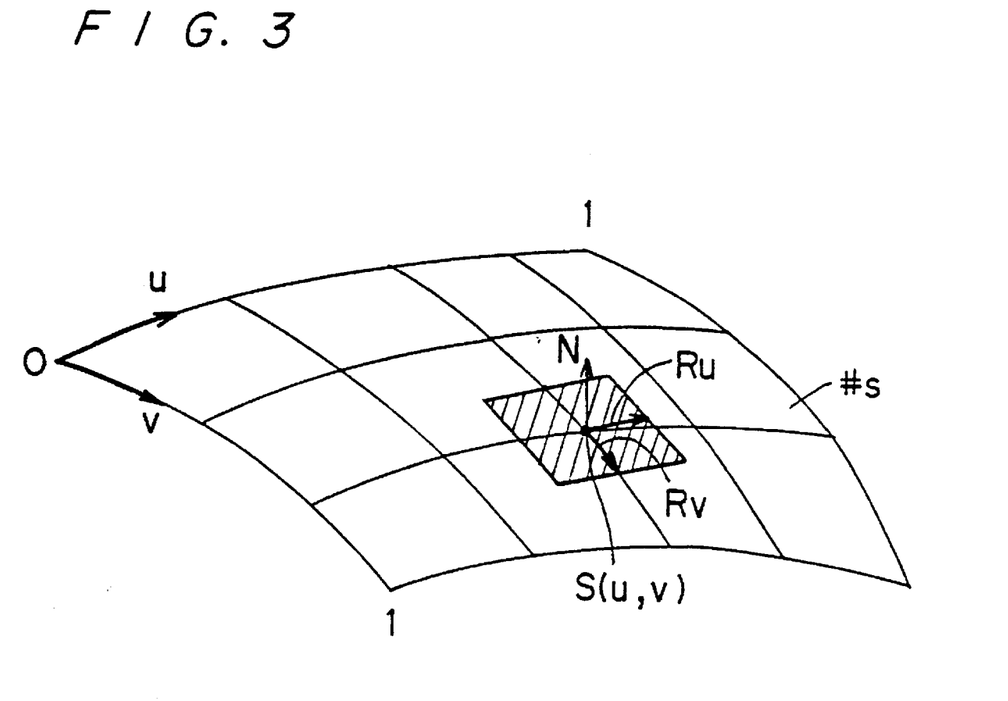
FIG. 3 is an illustration of a way of defining a curved surface in the method of the present invention.

As shown in FIG. 3, a curved surface #s is defined by two parameters u and v which are independent from the rectangular coordinate system. A standard (function) S to designate a point is determined with respect to the parameters u and v ($0 \leq u \leq 1$, $0 \leq v \leq 1$).

When the function S is differentiable (smooth), the function S expresses a curved surface. In this case, the tangential vector for the u direction and the tangential vector for the v direction with respect to a point on the curved surface #s can be expressed as follows:

$$\eta S/\eta u$$

$$\eta S/\eta v$$

Further, the twist vector can be expressed as follows:

$$\eta^2 S/\eta u \eta v$$

Incidentally, the differentiable function S with respect to the parameters u and v can be converted into a function in the rectangular coordinate system (x, y, z). By using differentiable functions x, y and z with respect to the parameters u and v, a point S(u, v) calculated by the differentiable function S can be converted into a point (x, y, z) in the rectangular coordinate system.

The cutting tool 6 has a ball tip which has a radius R. Accordingly, the center of the ball tip of the cutting tool 6 should be located at a distance R in the normal direction from the surface. In a case wherein machining is carried out based on paths of the center of the ball tip of the cutting tool 6, it is necessary to figure out the normal vectors with respect to points on the surface.

The tangential vector Ru for the u direction and the tangential vector Rv for the v direction with respect to a point S(u, v) on the curved surface #s are expressed as follows:

$$Ru = \frac{\eta S/\eta u}{|\eta S/\eta u|}$$

$$Rv = \frac{\eta S/\eta v}{|\eta S/\eta v|}$$

A plane including the point S(u, v) and the tangential vectors Ru and Rv is referred to as a tangential plane (shadowed in FIG. 3), and the normal vector N is calculated by $N = Ru \times Rv$. In order to cut the point S(u, v), the center of the ball tip of the cutting tool must be located in a point P calculated as follows:

$$P = S(u, v) + \epsilon \cdot R \cdot N \tag{1}$$

$\epsilon^2 = 1$ (+1: normal side, −1: abnormal side)
R: radius of the ball tip of the cutting tool Since the curved surface #s is a differentiable function with respect to the parameters u and v, the function can be approximately expressed by a group of polynomials based on Taylor series of analysis as follows:

$$f(u, v) = \sum_{i,j=0}^{n} a_{ij} u^i v^j$$

By using the polynomials, points on the curved surface #s can be expressed in the coordinate system (u, v). Further, the points expressed in the coordinate system (u, v) can be converted into values in the rectangular coordinate system (x, y, z) by using the functions x, y and z. Thus, the points on the curved surface #s can be calculated algebraically, which improves the accuracy of cutting and increases the processing speed.

Every curved surface is expressed by a group of polynomials with respect to its peculiar parameters u and v. However, according to the present invention, a plurality of continuous curved surfaces are defined by the same parameters u and v and are expressed by the same group of polynomials, and thus, the continuous curved surfaces are defined as a unified curved surface.

Definition of Curved Surfaces

A curved surface is defined strictly based on graphic data, such as three plane views and a perspective view, provided by the designer. In the views, outline curves and sectional curves of the surface are provided. From these data, a curved surface definition net is made to embody the curved surface imaged by the designer. The curved surface definition net is composed of many lattice points, and using the definition net, the curved surface is divided into a necessary number of patches. First, polynomials to express the respective patches are determined individually, and the polynomials are changed to belong to one group to express the whole curved surface.

In defining continuous curved surfaces, first, groups of polynomials to express the respective surfaces are determined in the above way. Next, based on the polynomials, a curved surface definition net is made to embody the unification of the continuous curved surfaces, and thereby, the continuous curved surfaces are unified into a single curved surface. Then, based on the curved surface definition net, the groups of polynomials are changed to belong to one group.

Figure 4:
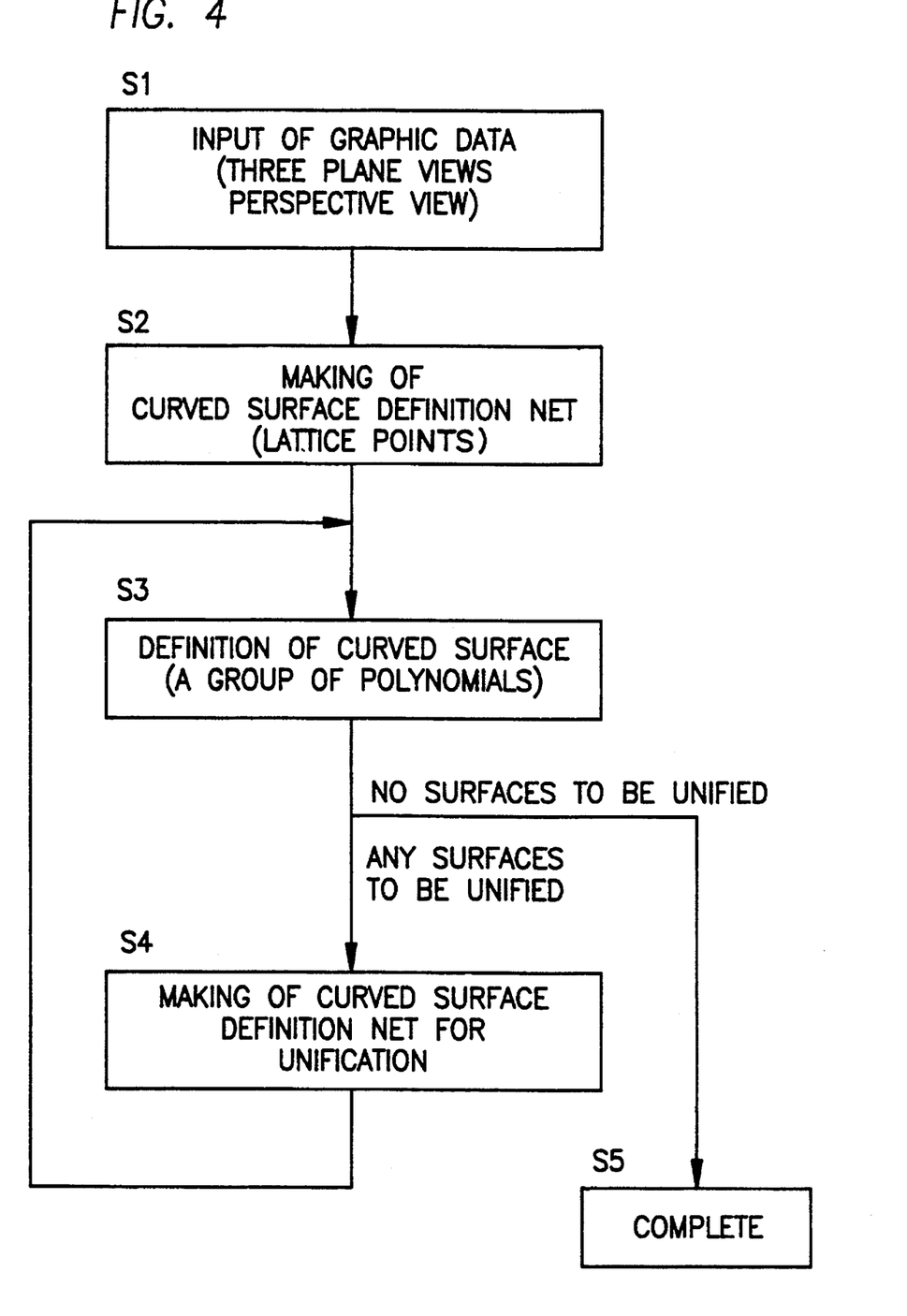
FIG. 4 is a flowchart showing a procedure in the method of the present invention.

FIG. 4 shows the procedure for definition of continuous curved surfaces. At step S1, graphic data provided by the designer are input, and at step S2, a curved surface definition net is made. At step 3, a group of polynomials to express the curved surface is determined based on the curved surface definition net. If there are no other surfaces to be unified with the defined curved surface, the procedure is completed at step S5. If there are any surfaces to be unified with the defined curved surface, a curved surface definition net is made with respect to the surfaces to be unified at step S4, and a group of polynomials to express the continuous surfaces as a unified surface is determined at step S3.

1. Curved Surface Definition Net

A curved surface is defined from curves which are provided as graphic data by the designer. To recognize the shape of the curved surface, a curved surface definition net is made of many lattice points. The curved surface is divided by u-curves and v-curves in a u direction and in a v direction which are peculiar to the surface. Supposing that the number of u-curves and the number or v-curves are m and n respectively, intersections of the u curves and the v curves are expressed as follows:

$$u_o=0<u_1<\ldots<u_m=1$$

$$v_o=0<v_1<\ldots<v_n=1$$

With respect to each of the intersections $S(u_j, V_i)$, the tangential vector for the u direction $Su(u_j, v_i)$, the tangential vector for the v direction $Sv(u_j, v_i)$ and the twist vector $Suv(u_j, V_i)$ are determined. At that time, the tangential vectors and the twist vector are figured out based on:

$$Su(u, v)=\eta S/\eta u$$

$$Sv(u, v)=\eta S/\eta v$$

$$Suv(u, v)=\eta^2 S/\eta u \eta v.$$

Figure 5:
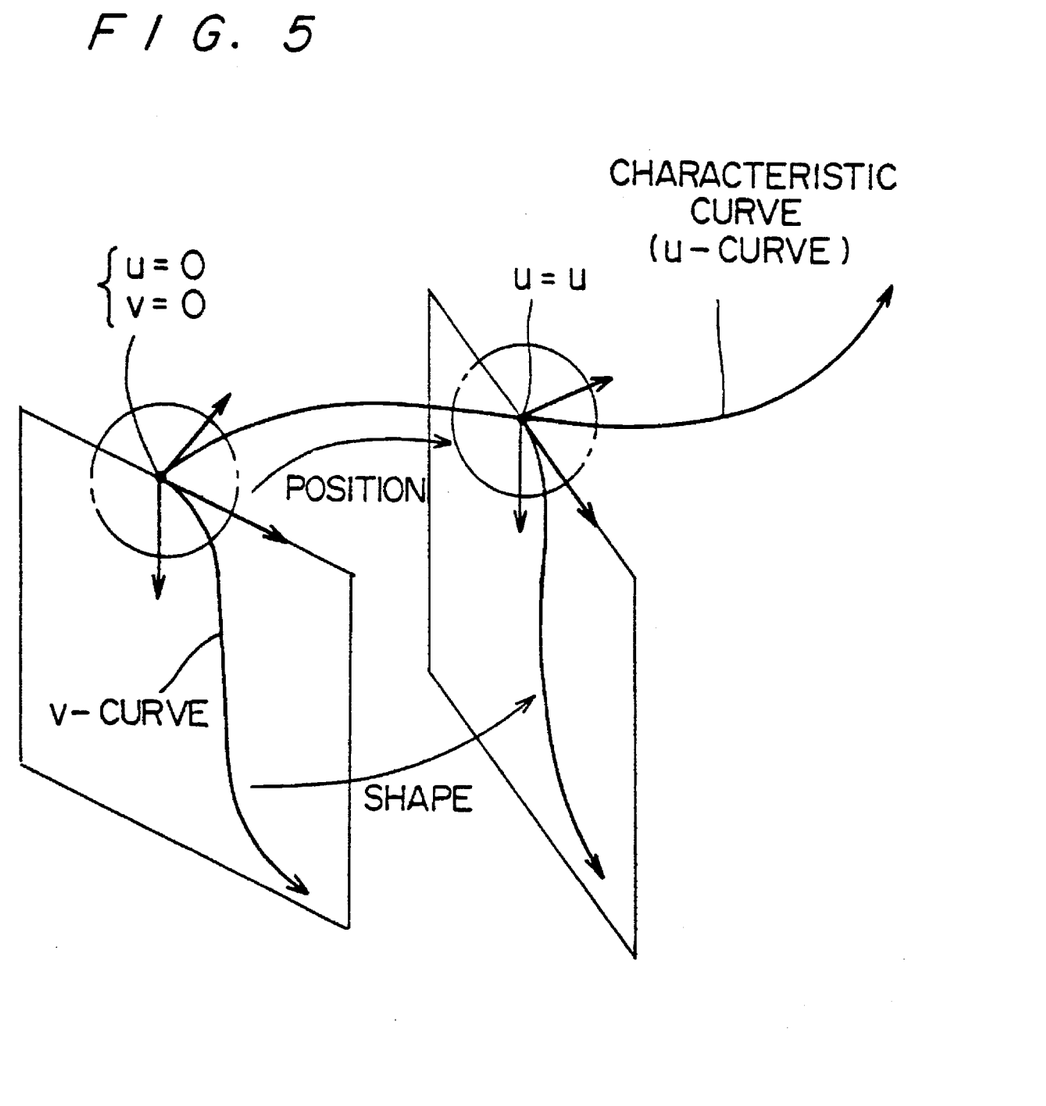
FIG. 5 is an illustration of another way of defining a curved surface in the method of the present invention.

If the provided graphic data do not include any points on the surface to be machined but include a u-curve and a v-curve, a differentiable standard (function) with respect to the parameters u and v is determined in order to make such a curved surface definition net. As shown in FIG. 5, a curved surface is regarded to be made by moving a v-curve along a u-curve changing its shape. When the provided graphic data include a sectional curve, the sectional curve is handled as the v-curve. The v-curve is regarded to move along the u-curve changing its shape differentiably, and a differentiable function S is determined from the u-curve and the v-curve. Then, a point S(u, v) is defined by the function S, and the tangential vector Su for the u direction, the tangential vector Sv for the v direction and the twist vector Suv with respect to the point S(u, v) are calculated. Within a range $0 \leq u \leq 1$ and $0 \leq v \leq 1$, points on the surface can be defined by the function S, and a curved surface definition net is composed of these points.

2. Polynomials to Express a Curved Surface

Based on the curved surface definition net, the shape of each patch to be machined is determined, and in each patch expressed by $u_{j-1} \leq u \leq u_j$ and $v_{i-1} \leq v \leq v_i$, a polynomial $S_{ji}$ with respect to parameters u and v is figured out. By combining the polynomials $S_{ji}$ which express the respective patches, the curved surface is defined. In figuring out the polynomials, the following conditions must be fulfilled:

(1) the polynomials must meet the provided graphic data, and more particularly must meet curves and values (dimensions, angles, etc.) shown in the provided drawings; and (2) the polynomials must sufficiently meet the designer's intention, that is, must expresses the sufficiently accurate surface as designed.

When a curved surface is defined as a combination of polynomials which express the respective patches of the curved surface, the polynomials must be differentiable at the borders among the patches. According to the present invention, with respect to each lattice point $S(u_j, v_i)$ of the curved surface definition net, the tangential vector $Su(u_j, v_i)$ for the u direction, the tangential vector $Sv(u_j, v_i)$ for the v direction and the twist vector $Suv(u_j, v_i)$ are calculated. Based on the vectors Su, Sv and Suv with respect to the respective lattice points (border points), polynomials to express the respective patches are determined. The polynomials obtained in this way are differentiable at the borders.

The provided graphic data sometimes include only some passing points. In this case, from all the provided points, a u direction and a v direction are determined. Then, a curved surface definition net is made based on the points and the u and v directions, and a group of polynomials are determined from the curved surface definition net.

3. Unification of Continuous Curved Surfaces

Any curved surface is defined in a coordinate system which reflects the characteristics of the surface. In a conventional method, curved surfaces which have distinct characteristics are defined as separate curved surfaces. Therefore, when a complicate shape is to be machined, a large number of curved surfaces must be defined, thereby increasing the volume of processing. According to the present invention, continuous curved surfaces which have distinct characteristics are unified into a single curved surface and expressed by a group of polynomials with respect to the same parameters.

Now, suppose that continuous curved surfaces S and S' are expressed by a group of polynomials with respect to parameters u and v and by a group of polynomials with respect to parameters u' and v' respectively. If a u-curve of the curved surface S intersects the curved surface S' at a point P(u, v) ($0 \leq u$), the intersection P can be also expressed by the parameters of the curved surface S' as P=S'(u', v'). Here, [Su(u, v), S'u(u', v')]≧[Sv(u, v), S'v(u', v')] is supposed. The u-curve of the surface S is connected to a u'-curve of the surface S' at the intersection P. Consequently, a curve which includes the u-curve of the curved surface S from u=0 to u=u and the u'-curve of the curved surface S' from u=u' to u=1 is newly made. In the same manner, a number n of curves are made, and every curve is divided into a number m of sections. Thus, a curved surface definition net with respect to the curved surfaces S and S' is made. Based on the curved surface definition net, the curved surfaces S and S' can be defined as a single curved surface, and moreover, the newly defined curved surface keeps the characteristics of both the surfaces S and S'.

Paths of the Cutting Tool

After the definition of a curved surface, the cutting tool 6 moves to machine the curved surface. The cutting tool 6 has a ball tip of a radius R, and the center of the ball tip should be located at a distance R vertically from the surface. The location of the center P of the ball tip is calculated by the aforementioned expression (1).

In moving the cutting tool 6 along a curve on a curved surface S, a path of the center of the ball tip of the tool 6 is generated by calculating points P at the distance R from the curve by using the expression (1). In a conventional method, with respect to every cutter location, a point P at the distance R in the normal direction, that is, the normal vector N (see FIG. 3) is calculated. Further, conventionally, since the curved surface S is not expressed by an expression, in order to calculate the normal vector N with respect to a cutter location, other two points must be figured out. For these reasons, generation of paths of the center of the ball tip in a conventional method is complicated and takes a long time.

However, according to the present invention, with respect to only the intersections ($u_j$, $v_i$) of u-curves and v-curves which form the curved surface definition net, points P at the distance R in the normal direction are calculated by using the expression (1). Then, from the points P, a curved surface definition net for an offset surface *S of the surface S is made. Based on the curved surface definition net, a group of polynomials to express the offset surface *S on which the center of the ball tip moves is determined. The polynomials must meet the following condition:

$$*S(u, v) = S(u, v) + \epsilon \cdot R \cdot N \quad (2)$$

$$(0 \leq u \leq 1, 0 \leq v \leq 1)$$

The polynomials calculated according to the present invention meet the condition within an allowable error. It is no longer necessary to calculate a large number of points P at a distance R from the surface S by using the expression (1). In the present method, paths of the center of the ball tip of the cutting tool are generated by calculating points *S(u, v) on the offset surface *S by using the polynomials, which is easy and increases the processing speed.

Limitation of a Curved Surface

A curved surface is divided into a cut region which is to be cut out as a part of the final shape and a non-cut region which is not required to be cut out. According to the present invention, the division of the curved surface is carried out by designating a curve and a point P.

Figure 6:
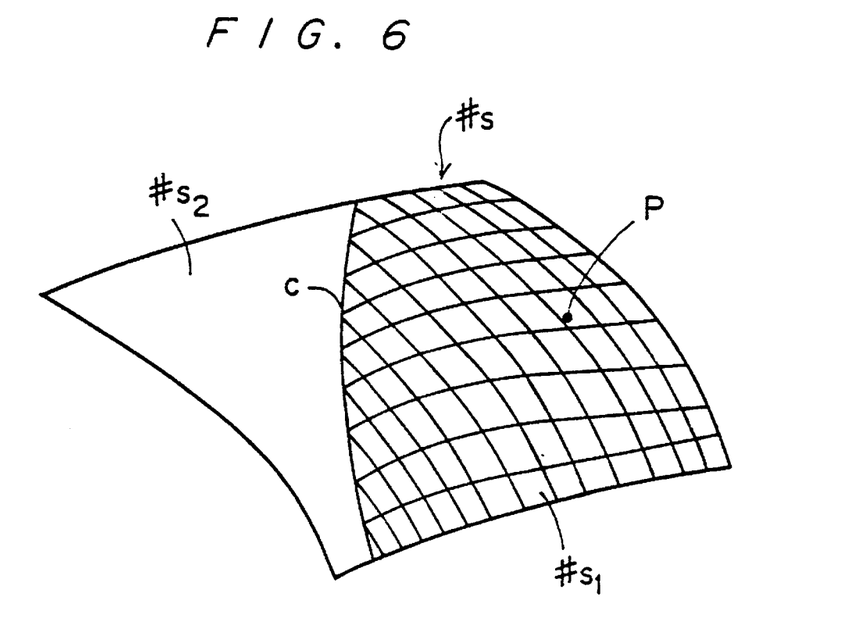
FIG. 6 is an illustration of limitation of a curved surface in the method of the present invention.

As shown in FIG. 6, a curve c divides a curved surface #s into a cut region #$s_1$ and a non-cut region #$s_2$, and a point P is designated in the cut region #$s_1$. The computer has a program so as to recognize the region #$s_1$ including the point P as a cut region. In generating paths of the cutting tool 6 to machine the surface #s, the computer omits generation of the tool paths with respect to the non-cut region #$s_2$.

Figure 7:
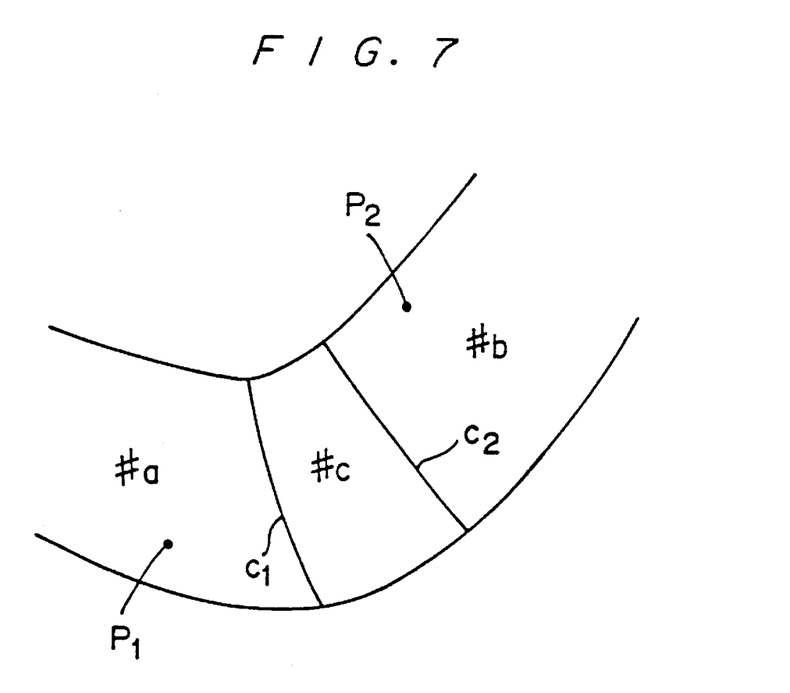
FIG. 7 is an illustration of a case wherein the imitation of a curved surface should be carried out.

FIG. 7 shows continuous curved surfaces #a, #b and #c. The curved surface #c has so distinct characteristics from the other curved surfaces #a and #b that a single curved surface definition net with respect to these surfaces #a, #b and #c cannot be made. In such a case, the limitation of a curved surface is carried out. In the case of FIG. 7, the intersection $c_1$ between the surfaces #a and #c and the intersection $c_2$ between the surfaces #c and #b are designated. Then, points $P_1$ and $P_2$ are designated in the surfaces #a and #b respectively. In generating paths of the cutting tool to machine the surface #a, the computer carries out generation of tool paths only with respect to the region which is limited by the intersection $c_1$ and includes the point $P_1$. In generating paths of the cutting tool to machine the surface #b, the computer carries out the generation of tool paths only with respect to the region which is limited by the intersection $c_2$ and includes the point $P_2$.

Although the present invention has been described in connection with the preferred embodiment, it is to be noted that various changes and modifications are possible to those who are skilled in the art. Such changes and modifications are to be understood as being within the scope of the present invention.

What is claimed is:

1. A three-dimensional machining method for machining a workpiece three-dimensionally, the method comprising the steps of:

inputting data about a plurality of curved surfaces which have distinct characteristics;

defining the plurality of curved surfaces, based on the inputted data, as a unified curved surface defined by a group of polynomials with respect to parameters u and v as follows:

$$f(u, v) = \sum_{i,j=0}^{n} a_{ij} u^i v^j$$

calculating a surface to be machined from the curved surface defined by the group of polynomials; and machining the workpiece to create the calculated surface.

2. A three-dimensional machining method as claimed in claim 1, wherein with respect to a point S(u, v) calculated by using the polynomials, a position P of a center of a ball tip with a radius R of a cutting tool to machine the point S(u, v) is calculated as follows:

$$P = S(u, v) + \epsilon \cdot R \cdot N$$

wherein N denotes a normal vector, and $\epsilon^2 = 1$, where +1 indicates a normal side and −1 indicates an abnormal side.

\* \* \* \* \*